US012739101B2

(12) United States Patent
Horseman et al.

(10) Patent No.: US 12,739,101 B2
(45) Date of Patent: Sep. 15, 2026

(54) COOKIE ENCRYPTION KEY COMPROMISE VIA AUTONOMOUS PENTESTING

(71) Applicant: Horizon 3 AI, Inc., Dover, DE (US)

(72) Inventors: James Walter Horseman, Wesley Chapel, FL (US); Zachary Daniel Hanley, Apex, NC (US)

(73) Assignee: Horizon 3 AI, Inc., Dover, DE (US)

( * ) Notice: Subject to any disclaimer, the term of this patent is extended or adjusted under 35 U.S.C. 154(b) by 37 days.

(21) Appl. No.: 19/070,189

(22) Filed: Mar. 4, 2025

(65) Prior Publication Data

US 2026/0270045 A1 Sep. 10, 2026

(51) Int. Cl.

| | |
|---|---|
| ***H04L 9/08*** | (2006.01) |
| ***H04L 9/14*** | (2006.01) |
| ***H04L 9/40*** | (2022.01) |

(52) U.S. Cl.

CPC .............. *H04L 9/0822* (2013.01); *H04L 9/14* (2013.01); *H04L 63/1433* (2013.01)

(58) Field of Classification Search

CPC ...... H04L 9/0822; H04L 9/14; H04L 63/1433

See application file for complete search history.

(56) References Cited

U.S. PATENT DOCUMENTS

| | | | | |
|---|---|---|---|---|
| 2006/0036875 | A1 * | 2/2006 | Karoubi | H04L 63/168 713/193 |
| 2013/0014263 | A1 * | 1/2013 | Porcello | H04L 63/0272 726/25 |
| 2017/0169100 | A1 * | 6/2017 | Reshadi | G06F 21/54 |
| 2023/0421583 | A1 * | 12/2023 | Olden | H04L 63/1416 |
| 2024/0037279 | A1 * | 2/2024 | Marudi | G06F 21/6263 |
| 2024/0248997 | A1 * | 7/2024 | Endler | G06F 16/9538 |

* cited by examiner

*Primary Examiner* — Blake I Narramore

(74) *Attorney, Agent, or Firm* — Flare IP PLLC

(57) ABSTRACT

An autonomous pentesting agent may execute an autonomous pentest of a network to gain unauthorized access to a network asset of the network associated with a user and identify cookies associated with the user stored on the network asset. The agent may retrieve an encrypted version of a master key used to encrypt the cookies. The agent may retrieve multiple keys used to encrypt the master key via multi-stage encryption and decrypt the master key via a multi-stage decryption using the multiple keys. At least one key of the multiple keys may include a hardcoded key embedded within a binary associated with an application running on the network asset. The agent may obtain information associated with the user or associated with the network asset based on the unauthorized access to the network asset and using a cookie of the multiple cookies that is decrypted using the master key.

20 Claims, 7 Drawing Sheets

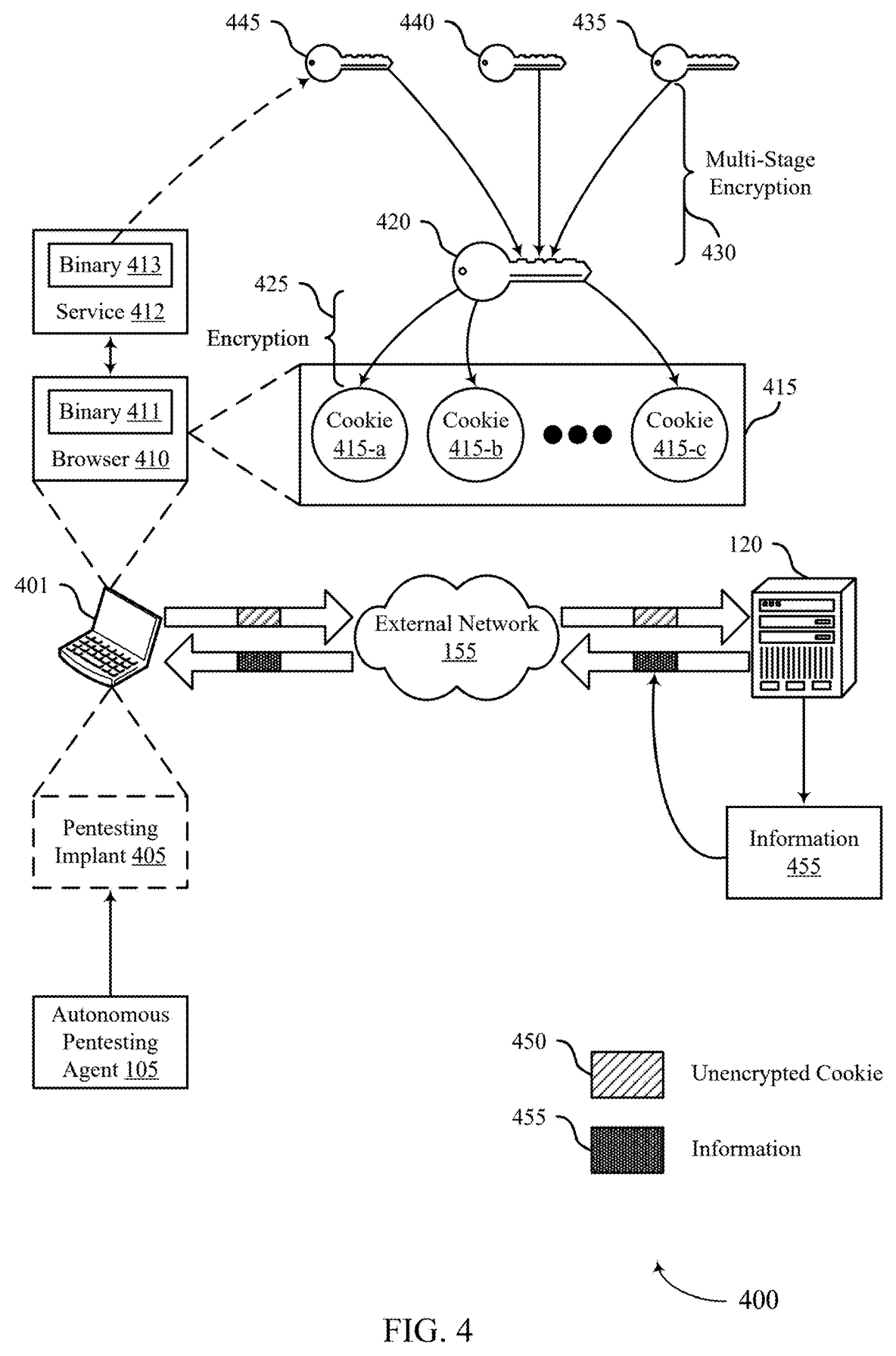

445
440
435
Multi-Stage Encryption
430
420
425
Encryption
Binary 413
Service 412
Binary 411
Browser 410
Cookie 415-a
Cookie 415-b
Cookie 415-c
415
120
401
External Network 155
Information 455
Pentesting Implant 405
Autonomous Pentesting Agent 105
450 Unencrypted Cookie
455 Information
400

FIG. 4

COOKIE ENCRYPTION KEY COMPROMISE VIA AUTONOMOUS PENTESTING

BACKGROUND

In networking, penetration testing or "pentesting" refers to conducting security operations that simulate a cybersecurity attack in order to identify vulnerabilities in a network. The goal of pentesting is to mimic the actions of a malicious actor and discover loopholes or other vulnerabilities before they can be exploited. Pentesting may include techniques such as scanning for vulnerabilities, testing system configurations and security protocols, and attempting controlled attacks to evaluate defense mechanisms within a network. Network administrators can remediate vulnerabilities uncovered during pentesting to prevent malicious actors from compromising network security using those vulnerabilities. Practicing regular pentesting can aid in maintaining high security standards, protecting sensitive data, and ensuring the continuity of network services.

SUMMARY

The described techniques relate to improved methods, systems, devices, and apparatuses that support cookie encryption key compromise via autonomous pentesting.

In some aspects, the techniques described herein relate to a method for compromising cookies via autonomous pentesting including: executing an autonomous pentest of a network, wherein executing the autonomous pentest includes gaining unauthorized access to a network asset of the network associated with a user and identifying a plurality of cookies associated with the user stored on the network asset, the plurality of cookies encrypted via a master key; retrieving an encrypted version of the master key based at least in part on identifying the plurality of cookies encrypted via the master key, wherein the encrypted version of the master key is encrypted via a multi-stage encryption using a plurality of keys; retrieving the plurality of keys based at least in part on retrieving the encrypted version of the master key, wherein at least one key of the plurality of keys includes a hardcoded key embedded within a binary associated with an application running on the network asset and at least one other key of the plurality of keys is retrieved via the autonomous pentest of the network; decrypting the master key via a multi-stage decryption using the plurality of keys; and obtaining information associated with the user or associated with the network asset based at least in part on the unauthorized access to the network asset and using a cookie of the plurality of cookies that is decrypted using the master key.

In some aspects, the techniques described herein relate to an apparatus for compromising cookies via autonomous pentesting, including: one or more memories storing processor-executable code; and one or more processors coupled with the one or more memories and individually or collectively operable to execute the code to cause the apparatus to: execute an autonomous pentest of a network, wherein executing the autonomous pentest includes gaining unauthorized access to a network asset of the network associated with a user and identifying a plurality of cookies associated with the user stored on the network asset, the plurality of cookies encrypted via a master key; retrieve an encrypted version of the master key based at least in part on identifying the plurality of cookies encrypted via the master key, wherein the encrypted version of the master key is encrypted via a multi-stage encryption using a plurality of keys; retrieve the plurality of keys based at least in part on retrieving the encrypted version of the master key, wherein at least one key of the plurality of keys includes a hardcoded key embedded within a binary associated with an application running on the network asset and at least one other key of the plurality of keys is retrieved via the autonomous pentest of the network; decrypt the master key via a multi-stage decryption using the plurality of keys; and obtain information associated with the user or associated with the network asset based at least in part on the unauthorized access to the network asset and using a cookie of the plurality of cookies that is decrypted using the master key.

In some aspects, the techniques described herein relate to a non-transitory computer-readable medium storing code for compromising cookies via autonomous pentesting, the code including instructions executable by one or more processors to: execute an autonomous pentest of a network, wherein executing the autonomous pentest includes gaining unauthorized access to a network asset of the network associated with a user and identifying a plurality of cookies associated with the user stored on the network asset, the plurality of cookies encrypted via a master key; retrieve an encrypted version of the master key based at least in part on identifying the plurality of cookies encrypted via the master key, wherein the encrypted version of the master key is encrypted via a multi-stage encryption using a plurality of keys; retrieve the plurality of keys based at least in part on retrieving the encrypted version of the master key, wherein at least one key of the plurality of keys includes a hardcoded key embedded within a binary associated with an application running on the network asset and at least one other key of the plurality of keys is retrieved via the autonomous pentest of the network; decrypt the master key via a multi-stage decryption using the plurality of keys; and obtain information associated with the user or associated with the network asset based at least in part on the unauthorized access to the network asset and using a cookie of the plurality of cookies that is decrypted using the master key.

BRIEF DESCRIPTION OF THE DRAWINGS

FIG. 4 shows an example of a computing system that supports cookie encryption key compromise via autonomous pentesting in accordance with aspects of the present disclosure.

DETAILED DESCRIPTION

Figure 1:
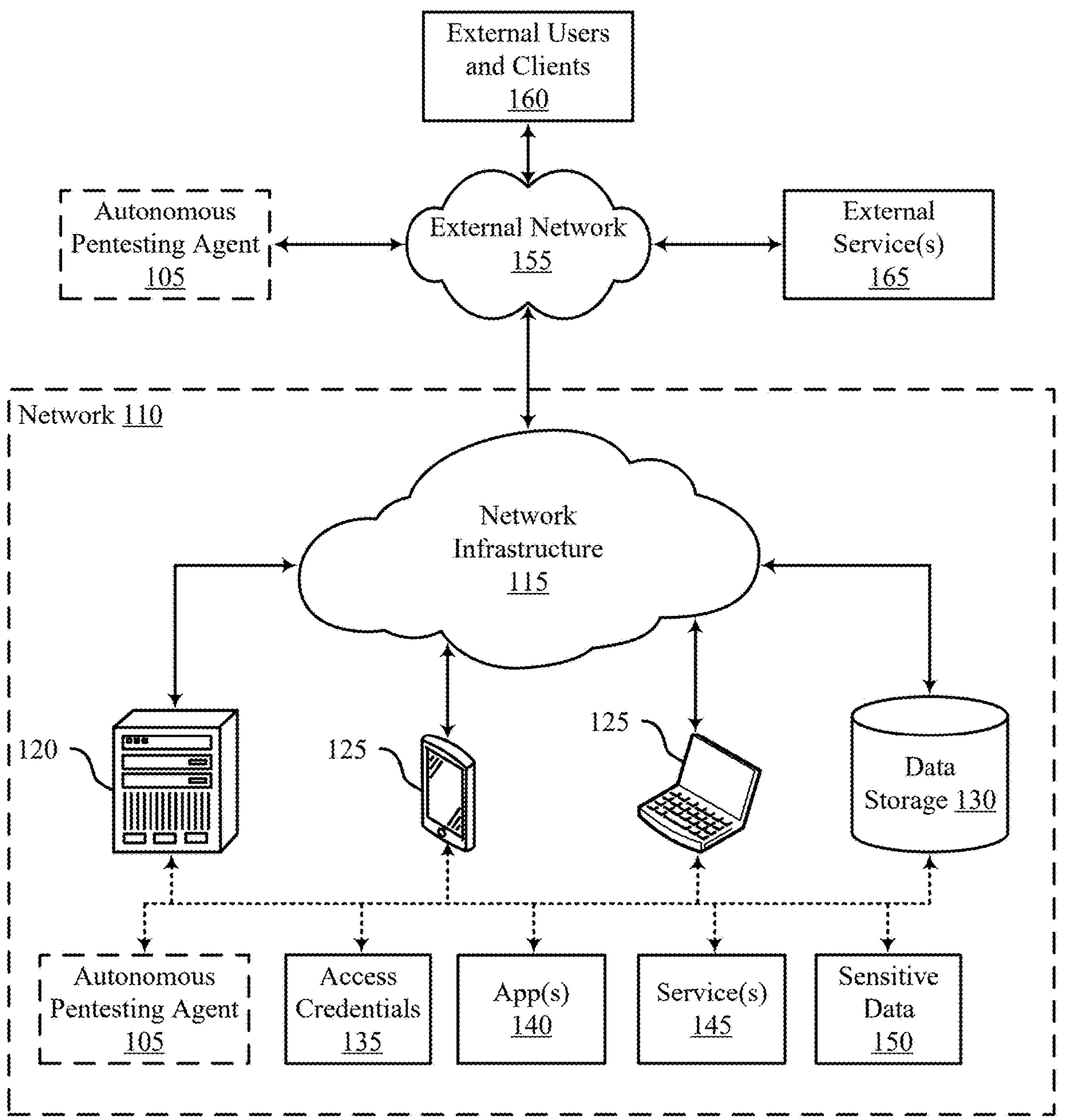
FIG. 1 shows an example of a computing environment that supports cookie encryption key compromise via autonomous pentesting in accordance with aspects of the present disclosure.

Computer applications (e.g., web browsers, email clients, web-based desktop applications, cloud storage clients, media streaming clients, virtual machine emulators, or other applications integrating with cloud services) running on computing devices may store cookies used to maintain sessions between users and application servers or websites. For example, a user may establish a session on an application (e.g., a browser) by logging in to a cloud service and selecting an option to stay logged in. The application may store a cookie (e.g., a browser cookie) representative of the session for the user such that, if the user leaves the application and later returns, the application may reestablish the session using the cookie without the user providing login information again. In some cases, the application may store the cookie in an encrypted form to secure the session against an attacker attempting to obtain and use the cookie. For example, the application may encrypt the cookie using a master key. When a user accesses an application and requests to re-establish a session, the application may use the master key to decrypt the cookie and use the cookie to re-establish a session for the user. That is, the master key may be controlled by the application and may be used to decrypt cookies upon request. In some cases, the application may also encrypt the master key. For example, the application may encrypt the master key via multi-stage encryption involving a different key or set of keys at each stage of encryption. The multi-stage encryption involving the multiple keys may be a three-stage encryption process that encrypts the master key using a system key, a user key, and an application key at respective stages or layers of the encryption process.

An autonomous pentesting agent described herein may perform an autonomous pentest of a network involving decryption of the encrypted cookies to gain unauthorized access to the master key and assess security vulnerabilities within the network (e.g., by decrypting and using the cookies to compromise the network). The autonomous pentesting agent may retrieve the multiple keys used to encrypt the master key and use the multiple keys to decrypt the master key. As an example, for applications using the three-stage encryption process discussed above, the autonomous pentesting agent may retrieve the system key and the user key via unauthorized access to a network asset associated with the application. The application key may be hardcoded into a binary associated with the application, and the autonomous pentesting agent may retrieve the application key directly from the binary associated with the application or be made aware of the application key in advance of the autonomous pentest of the network. The autonomous pentesting agent may use the system key, the user key, and the application key to decrypt the master key and, in turn, decrypt cookies stored by the application. The autonomous pentesting agent may decrypt the cookies offline, such as without communicating with the application or any services of the application. That is, the autonomous pentesting agent may decrypt the cookies offline using the retrieved keys—rather than attempting to impersonate the user to the application—and request decryption of the cookies. Using the decrypted cookies, the autonomous pentesting agent may transmit and receive communications with the application server via the sessions maintained using the cookies to obtain information associated with the network.

The autonomous pentesting agent may utilize the techniques described herein to improve network security. For example, the autonomous pentesting agent may retrieve and use cookies during an autonomous pentest to identify vulnerable information and weaknesses within the network or within third-party services associated with users of the network. The autonomous pentesting agent may provide recommendations, perform remediation, or both based on the information obtained using the cookies during the autonomous pentest. By providing recommendations or performing remediation with respect to identified security vulnerabilities of the network, the autonomous pentesting agent may eliminate or reduce the risk of an attack on the network by a malicious actor.

FIG. 1 illustrates an example of a computing environment 100 that supports cookie encryption key compromise via autonomous pentesting in accordance with aspects of the present disclosure. The computing environment 100 may include an autonomous pentesting agent 105 that performs an autonomous pentest of a network 110. The network 110 may include one or more devices or systems, such as a network infrastructure 115, server 120, computing devices 125, data storage 130, or any combination thereof. The devices or systems of the network 110 may be configured to access or provide various network information and services, such as access credentials 135, app(s) 140, service(s) 145, sensitive data 150, or any combination thereof.

The network 110 may allow the server 120, the computing devices 125, and the data storage 130 to communicate (e.g., exchange information) with one another. For example, the network infrastructure 115 may include any quantity of communications links and any quantity of hubs, bridges, routers, switches, ports, or other physical or logical network components that support communication between the server 120, computing devices 125, and data storage 130 of the network 110 as well as communication between the network 110 (e.g., the private network) and an external network 155 (e.g., the Internet). The network 110 may include aspects of one or more wired networks, one or more wireless networks (e.g., cellular networks), or any combination thereof. The network 110 may include aspects of one or more public networks or private networks, as well as secured or unsecured networks, or any combination thereof. For example, the network 110 may be an example of a private network that includes one or more public-facing or external assets that are accessible via an external network 155. As an example, the external network 155 may refer to the Internet, and users, such as external users and clients 160, may access the network 110 via the external network 155 through a website or application that is on the external network 155. For example, the external users and clients 160, the external service(s) 165, or both may access network information and services via the external network 155 (e.g., via the Internet), including the access credentials 135, app(s) 140, service(s) 145, and sensitive data 150.

The network 110 may be accessible via one or more hosts. For example, hosts may be examples of real or virtual machines that are connected to and capable of accessing the network 110. Real machines may refer to machines having or made up of hardware components including a central processing unit (CPU), memory, hard drive, or the like, such as physical or tangible computers or servers (e.g., the server 120, the computing devices 125, etc.). Virtual machines may refer to software within or running on a physical computer or server using portions of the CPU, memory, hard drive, or the like of the physical computer or server. A physical computer or server may include or support multiple virtual machines, such as multiple tenants (e.g., in a multi-tenant environment). The server 120 and the computing devices 125 may be examples of hosts. Hosts may communicate data with other devices within the network 110 and outside of the network (e.g., with devices in an external network 155). For example, the server 120 may send data to and receive data from one or more of the computing devices 125. Additionally, or alternatively, hosts may access resources of the network 110, including the access credentials 135, app(s) 140, service(s) 145, or sensitive data 150. As used herein, hosts may refer to web hosts, cloud hosts, virtual hosts, remote hosts, or the like.

Hosts may be examples of and include network assets. For example, a host may be an example of a type of network asset that has access to other network assets, such as applications, services, and resources. As used herein, network assets refer to machines that include network shares. For example, network assets may be examples of machines (e.g., real or virtual machines) that include shares of the network 110, such as file sharing systems. Network assets may be obtained and utilized by attackers to compromise the network 110. The server 120, the computing devices 125, the data storage 130, and the access credentials 135, app(s) 140, service(s) 145, and sensitive data 150 accessible via the devices and systems of the network 110 may all be examples of network assets. For example, physical devices (e.g., servers, computing devices, data storage, etc.) and systems may be considered network assets as well as information, apps, and services accessible through physical devices and systems of the network 110.

Hosts may store, provide, or implement access credentials 135, app(s) 140, service(s) 145, sensitive data 150, or any combination thereof. In some cases, computing devices 125 on the network may access the one or more assets (e.g., access credentials 135, app(s) 140, service(s) 145, sensitive data 150, etc.) via the server 120 (e.g., via a host). Additionally, or alternatively, computing devices 125 may locally store or otherwise access the one or more assets of the network 110. For example, users of the network 110 may access app(s) 140 and service(s) 145 via the computing devices 125 directly or indirectly (e.g., via a connection between the computing devices 125 and the server 120).

The autonomous pentesting agent 105 may perform a pentest of the network 110. As used herein, a penetration test or a "pentest" may refer to one or more security operations that simulate a cybersecurity attack in order to identify vulnerabilities in the network 110. The autonomous pentesting agent 105 may perform the pentest of the network 110 using one or more artificial intelligence (AI) models. For example, the autonomous pentesting agent 105 may be "autonomous," as the autonomous pentesting agent 105 may perform the pentest without a requirement of hard-coding, user inputs, or the like and, instead, by using the one or more AI models. The autonomous pentesting agent 105 may identify, via the pentest, security vulnerabilities of the network 110. An example of an output of the pentest may be described in greater detail elsewhere herein, including with reference to FIG. 2.

The autonomous pentesting agent 105 may, via the one or more AI models, determine and implement an attack path for a pentest. For example, the autonomous pentesting agent 105 may identify or select an asset of the network 110 to attempt to access initially and, from that asset, another asset to attempt to access, and so on. In other words, the autonomous pentesting agent 105 may use the one or more AI models to mimic decisions of an attacker. The one or more AI models may output a targeted asset of the network 110 to be subject to an access attempt by the autonomous pentesting agent 105 based on inputs including context of various assets in the network 110. In other words, the one or more AI models may output targeted assets based on the relative position of assets within the network 110, asset types, downstream assets (e.g., accessible after or through accessing a targeted asset), or the like.

The one or more AI models may be trained using data of previous pentests of the network 110 or other networks. For example, an autonomous pentesting service that deploys the autonomous pentesting agent 105 may train one or more AI models used by the autonomous pentesting agent 105 using tactics, techniques, and procedures (TTPs) of attackers (e.g., human or automated pentests), autonomous pentests performed on the network 110 previously or on other networks, or both. The autonomous pentesting agent 105 may perform improved pentests after the one or more AI models are trained using previous pentests of the network 110. That is, as the autonomous pentesting agent 105 learns more about the network 110, the autonomous pentesting agent 105 may perform pentests with higher performance levels (e.g., higher accuracy, higher quantities of potential attack paths, etc.).

In some cases, the pentest may be internal or external to the network 110. For example, the autonomous pentesting agent 105 may be deployed at a host device of the network 110 (e.g., deployed to the server 120 or computing devices 125). In such examples, the autonomous pentesting agent 105 may perform the pentest as an internal user of the network 110. Such internal pentests may be indicative of or emulate internal security threats to the network, such as from employees of an organization or an attacker that has otherwise obtained access to the network 110 internally. Alternatively, the autonomous pentesting agent 105 may be deployed at the external network 155. For example, the autonomous pentesting agent 105 may perform the pentest as an external user of the network 110, such as by accessing external or public-facing assets of the network 110 on the external network 155.

By performing the pentest autonomously via the autonomous pentesting agent 105, techniques described herein may support improved performance related to speed, identification of security vulnerabilities, and provision of remediation measures. For example, the pentest, when performed autonomously using the autonomous pentesting agent 105, may support improved performance and, by extension, improved security of the network 110 against cybersecurity attacks relative to hard-coded (e.g., automated) or manual (e.g., human operated) pentests.

As described herein, the autonomous pentesting agent 105 may improve network security by identifying security vulnerabilities associated with cookies stored on a host device of the network 110. For example, the autonomous pentesting agent 105 may retrieve an encrypted version of a master key. The master key may encrypt cookies stored on the host device, and the encrypted version of the master key may be encrypted using a multi-stage encryption using multiple keys. The autonomous pentesting agent 105 may then retrieve the multiple keys used to encrypt the master key and decrypt the master key. Using the decrypted master key, the autonomous pentesting agent 105 may decrypt cookies on the host device. The autonomous pentesting agent 105 may use the decrypted cookies to obtain information associated with a user or the network 110, such as by attempting to mine data from user sessions with network or cloud services using the decrypted cookies. By identifying the information accessible to the autonomous pentesting agent 105 through the cookies, the autonomous pentesting agent 105 may identify whether sensitive information would be accessible to an attacker if the cookies were compromised by a malicious actor, such as in an operation similar to the one executed by the autonomous pentesting agent 105 during the pentest. For example, the autonomous pentesting agent 105 may output the information or a representation of the information (e.g., a redacted or summarized version of the information that omits or shortens potentially sensitive aspects) to a security team or service associated with the network 110 to determine whether the information is sensitive or analyze the information to determine whether sensitive data (e.g., personally identifying information (PII), financial information, trade secrets, etc.) is included.

The autonomous pentesting agent 105 may recommend and implement actions within the network 110 for securing the information. For example, the autonomous pentesting agent 105 may identify expiration times of the cookies during the autonomous pentest and provide recommendations to reduce durations of one or more cookie expiration times. That is, the autonomous pentesting agent 105 may identify long-lived sessions (e.g., authentication sessions) for one or more users and recommend termination of such sessions or proactively terminate the sessions on behalf of the users. Additionally, or alternatively, the autonomous pentesting agent 105 may analyze application history for users to detect security risks. For example, the autonomous pentesting agent 105 may identify indicators of compromise or, in the example of the application being a browser, malicious websites. In such examples, the autonomous pentesting agent 105 may recommend that actions associated with the indicators of compromise or the malicious websites be blocked or that permissions be required to perform such actions.

In some examples, the autonomous pentesting agent 105 may use the decrypted cookies to obtain information from external service(s) 165. For example, the external service(s) 165 may include a third-party Software as a Service (SaaS) system. The autonomous pentest executed by the autonomous pentesting agent 105 may identify weaknesses or misconfigurations in the third-party SaaS system (e.g., an organization's use of the third-party SaaS system). As an example, an organization associated with the network 110 may have one or more settings enabled or disabled in the third-party SaaS system that allow attackers to use cookies outside of the network from which the cookies were obtained (e.g., impossible travel).

Figure 2:
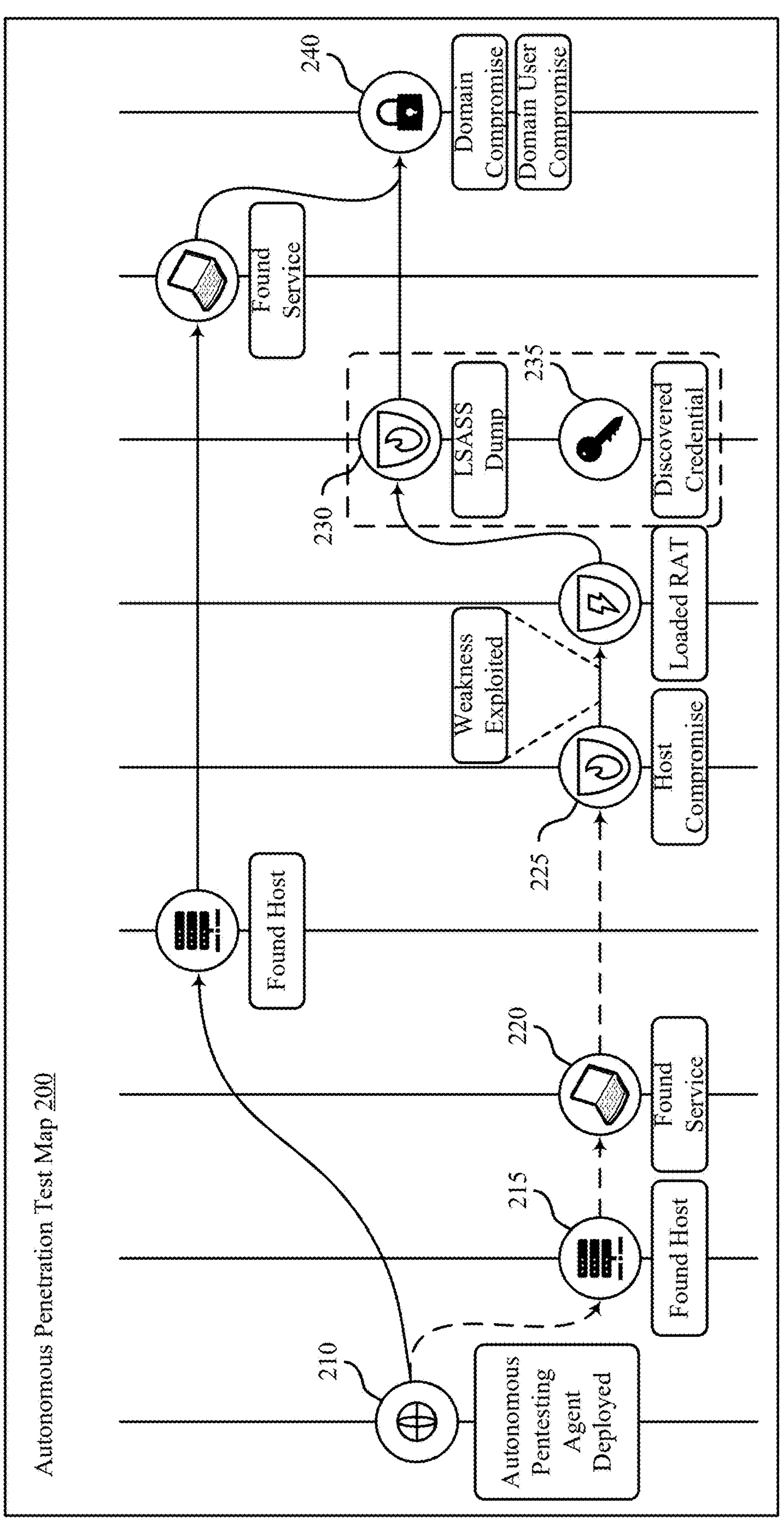
FIG. 2 shows an example of an autonomous pentest map that supports cookie encryption key compromise via autonomous pentesting in accordance with aspects of the present disclosure.

FIG. 2 shows an example of an autonomous pentest map 200 that supports cookie encryption key compromise via autonomous pentesting in accordance with aspects of the present disclosure. The autonomous pentest map 200 may be an example of an output or result of an autonomous pentest performed by an autonomous pentesting agent, such as a pentest performed by the autonomous pentesting agent 105 in the network 110 as described with reference to FIG. 1. The autonomous pentest map 200 may illustrate and describe an example of events of a pentest, including operations performed by and information obtained by the autonomous pentesting agent.

The autonomous pentest map 200 may include one or more types of events. For example, the autonomous pentest map 200 may include deployment 210 (e.g., of the autonomous pentesting agent), host identification 215, service identification 220, host compromise 225, deployment of an attacker tool 230 (e.g., an implant, such as a remote access tool (RAT)), credential identification 235, and access 240 (e.g., to a domain, a domain user, or both). The autonomous pentest map 200 includes one possible attack path including two attack branches that is generated based on an autonomous pentest. However, it is understood that any quantity of possible attack paths having any quantity of possible attack branches may be output from an autonomous pentest. In other words, the autonomous pentest map 200 may include one or more attack paths having one or more respective attack branches. In some cases, dozens, hundreds, or thousands of possible attack paths, branches, or both may be generated based on the autonomous pentest. Additionally, it is understood that while the autonomous pentest map 200 shown in FIG. 2 displays one example of an autonomous pentest for illustration, other maps including various different events, hosts, attack paths, and attack branches may result from various autonomous pentests.

In the example of the autonomous pentest map 200, the autonomous pentesting agent may identify an attack path having two attack branches. As used herein, attack "path" may be understood to refer to a series of events, set in motion by the autonomous pentest agent, that lead to a compromise of one or more components or assets of a network. Additionally, "branches" or "chains" of an attack path may refer to one or more events occurring simultaneously or in parallel that lead to the compromise. As an example, in a first attack branch of the autonomous pentest map 200, the autonomous pentesting agent may identify a host, identify a service, and compromise the host (e.g., through the service). On the compromised host, the autonomous pentesting agent may exploit a weakness identified on the service running on the host to load a RAT and remotely control the compromised host. The autonomous pentesting agent may perform, via the RAT, a Local Security Authority Subsystem Service (LSASS) dump, allowing the autonomous pentesting agent to discover a credential. The autonomous pentesting agent may use the credential in a different branch of the attack path. For example, in a second attack branch of the autonomous pentest map 200, the autonomous pentesting agent may identify a host and, through the identified host, a service. The autonomous pentesting agent may use the discovered credentials (e.g., of the first attack branch) at the service (e.g., of the second attack branch to obtain access 240 to the domain, domain user, or both.

An autonomous pentesting service may display the autonomous pentest map 200 such that compromised assets may be identified and security measures may be put in place. In some cases, the autonomous pentesting service may provide mitigation recommendations according to the autonomous pentest map 200. As an example, the autonomous pentest map 200 may identify a particular host or service as a security vulnerability for a network by tracing the access 240 backwards to a host identification 215 event. Accordingly, the autonomous pentesting service may provide a mitigation recommendation to be applied to the host involved in the host identification 215 event, such as according to how the host was identified or how access was obtained to the host at the host compromise 225 event. Similarly, the autonomous pentesting service may provide a mitigation recommendation to be applied to the service involved in the service identification 220 event.

In some cases, one or more attack paths identified by the autonomous pentesting service may include compromising an application that stores cookies on a host. For example, the autonomous pentesting service may obtain unauthorized access to the host, perform an LSASS dump to retrieve a system key and a user key based on the unauthorized access.

Using the system key, the user key, and a known application key associated with the application, the autonomous pentesting service may perform a multi-stage decryption process to recover a master key associated with encrypted cookies stored on the host. Having recovered the master key, the autonomous pentesting service may decrypt the stored cookies on the host and use the cookies to impersonate a user associated with the cookies and retrieve information via one or more user sessions.

The autonomous pentesting service may decrypt the master key offline to prevent detection by the host or the browser. For example, some attacks may involve requesting that a service (e.g., an elevator service) of a browser decrypts the master key. However, requesting the service to decrypt the master key may trip a security response on the browser or on the host. Accordingly, by retrieving system key, the user key, and the application key and using the keys to decrypt the master key (rather than requesting decryption), the autonomous pentesting service may circumvent the security system of the browser or the host.

The autonomous pentesting service may output an indication of information obtained via the one or more attack paths, including via the one or more user sessions at the application. The autonomous pentesting service may identify whether the information includes sensitive data and, in some examples, recommend remediation or mitigation actions. Additionally, or alternatively, the autonomous pentesting service may identify locations within the network from which a master key, keys that encrypt the master key, or both were retrieved. For example, the autonomous pentest map 200 may include an indication of where keys are retrieved from on the network such that a security vulnerability allowing access to such keys can be eliminated.

Figure 3:
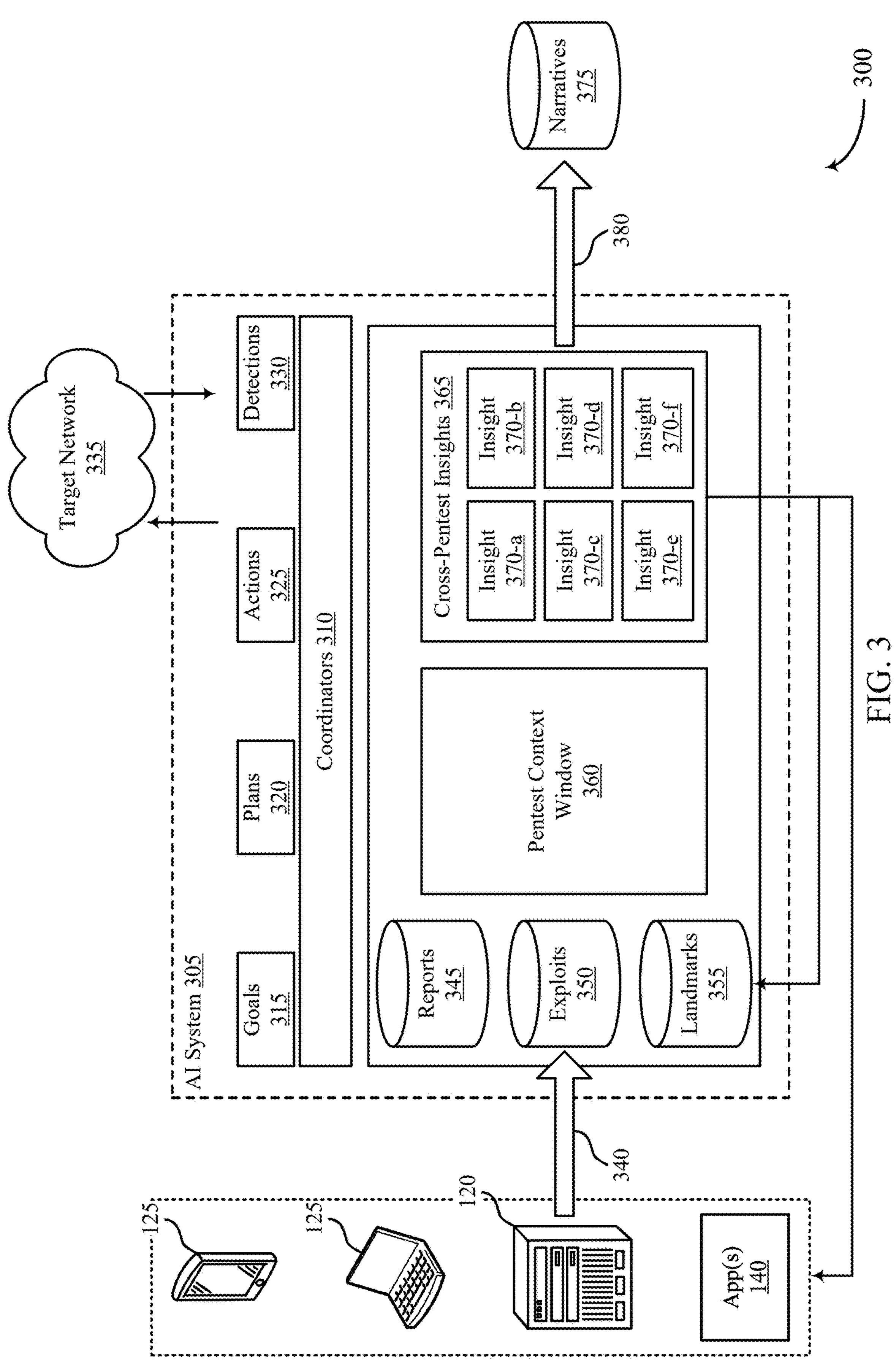
FIG. 3 shows an example of a computing environment that supports cookie encryption key compromise via autonomous pentesting in accordance with aspects of the present disclosure.

FIG. 3 shows an example of a computing environment 300 that supports cookie encryption key compromise via autonomous pentesting in accordance with aspects of the present disclosure. The computing environment 300 may implement or be implemented by the computing environment 100, the autonomous pentest map 200, or both. For example, the computing environment 300 may illustrate servers 120, computing devices 125, and app(s) 140 utilizing an AI system 305 to perform autonomous pentests.

In some examples, the AI system 305 may be a system designed to process data, learn from past experiences, and make determinations and predictions that mimic human cognitive functions. In some cases, the AI system 305 may implement or be implemented by one or more AI or machine learning (ML) models (e.g., AI/ML models). In some examples, an AI/ML model of the AI system 305 may be a supervised learning model configured to learn from labeled training data to generate predictions on inputs. In some other examples, an AI/ML model of the AI system 305 may be an unsupervised learning model that is configured to discover patterns in unlabeled data to generate predictions on inputs. In another example, the AI system 305 may implement reinforcement learning models that are configured to learn behaviors through trial-and-error (e.g., via experimentation). Additionally, or alternatively, the AI system 305 may implement neural networks (e.g., artificial neural networks (ANNs)) that include one or more layers configured to process information via a series of mathematical transformations.

Deep learning models may be a subset of neural networks designed and configured for tasks such as computer vision and natural language processing. In some examples, the AI system 305 may utilize a large language model (LLM) which utilizes a neural network architecture to process, understand, and generate natural language. For example, LLMs may be trained on a relatively large corpus of data (e.g., text data, image data, audio data, video data, among others) to perform natural language processing tasks such as text generation, translation, summarization, responding to natural language queries, data generation, or any combination thereof.

The AI system 305 may be an agentic AI system, meaning that the AI system 305 may act autonomously, at least for some operations, to achieve specified goals, make decisions, and take actions without direct human intervention (e.g., through the use of AI agents). In some cases, the AI system 305 may be an agentic AI system with limited human involvement where the AI system 305 may request human guidance or user input only in certain circumstances, such as if the AI system 305 is unable to make a decision or perform a subsequent operation. Further, the AI system 305 may use one or more AI/ML models to set and pursue goals 315 without those goals 315 being specifically defined by human input to the AI system 305. The AI system 305 may further generate plans 320 and execute sequences of actions 325 to achieve those goals 315 and adapt future behavior in accordance with real-time observations and feedback about the effectiveness of the actions 325 to achieve the desired outcomes or meet targets.

For example, in some cases, utilizing one or more AI/ML models, the AI system 305 may interface with one or more coordinators 310 that coordinate goals 315 and plans 320, actions 325, and detections 330 for achieving the goals 315. For example, for autonomous pentesting, the goals 315 of the AI system 305 may be to obtain access to data stored within a network 110, compromise (such as by obtain unauthorized administrative access or deploying unauthorized software to) a domain or a network asset of the network 110, or any combination thereof. To obtain the goals 315, the AI system 305 may generate one or more plans 320 that are based on actions 325 and detections 330. For example, to determine a next best action within a defined set of guardrails or instructions, the AI system 305 may generate a plan 320 that can include an action 325 to invoke (e.g., execute) one or more commands on a target network 335 to obtain a detection 330 from the target network 335.

In some examples, the target network may include one or more network assets such as servers 120, computing devices 125, data storages 130, app(s) 140, or any combination thereof. Further, obtaining a detection 330 from the target network 335 may include the AI system 305 retrieving telemetry data from the one or more network assets of the target network 335. In some cases, telemetry data obtained from the target network 335 may include logs, traces, metrics, events, or any combination thereof from the one or more network assets of the target network 335. For example, a detection 330 may include some data that is obtained from the target network 335 via an autonomous pentest that aids the AI system 305 in achieving the goals 315. In one example, the detection 330 may include an autonomous pentest obtaining a credential that is used to gain unauthorized access to a network asset, which may be an example of one of the goals 315. In another example, a detection 330 may be the autonomous pentest detecting a set of patterns of events indicated within logs of the target network 335, which may be utilized for achieving a respective goal 315. For example, a goal 315 may be to perform a successful credential compromise attack to gain unauthorized access to a network asset and a detection 330 may indicate information to aid an autonomous pentesting agent in performing the credential compromise attack.

In some examples, the AI system 305 may also interface with the coordinators 310 to perform autonomous pentests as described elsewhere herein, such as with reference to FIGS. 1 and 2. When performing autonomous pentests, the AI system 305 may collect and store a relatively large quantity (such as thousands, millions, or billions) of training data points or tokens for the AI system 305 to perform subsequent autonomous pentests. For example, each action 325 (e.g., command) executed via the AI system 305 may result in a collection of a relatively large quantity of training data points that indicate whether the action 325 succeeded or failed, why the action 325 succeeded or failed, which software, policies, or tools were used to execute the action 325 thar resulted in the action 325 succeeding or failing, or any combination thereof. Therefore, the AI system 305 may continuously obtain and update the training data used for training AI/ML models and perform reinforcement learning using collective intelligent to improve the weights and training of the AI/ML models.

In some examples, the training data for the AI system 305 may include telemetry data obtained from the target network 335, data obtained from servers 120, computing devices 125, and app(s) 140 via a developer pipeline 340, or both. In some cases, the training data may include indications of reports 345, exploits 350, and landmarks 355. A report 345 may indicate outputs or artifacts generated by the AI system 305 to document the discoveries, vulnerabilities, and results of an autonomous pentest. An exploit 350 may indicate the tools, techniques, operations, programs, code, and the like utilized by the AI system 305 to perform an autonomous pentest. A landmark 355 may indicate a point or marker within a network (e.g., the target network 335) to assist the AI system 305 to navigate and map a target environment during an autonomous pentest.

In some examples, the AI system 305 may obtain the reports 345, exploits 350, and landmarks 355 based on performing one or more autonomous pentests. In another example, one or more users (e.g., developers) may manually generate the reports 345, exploits 350, and landmarks 355 for training the AI system 305. In such cases, the one or more users may generate the data for the reports 345, exploits 350, and landmarks 355 and label the data for the AI system 305. Additionally, or alternatively, one or more users may utilize an LLM to generate the reports 345, exploits 350, and landmarks 355. For example, a user may prompt an LLM to generate the reports 345, exploits 350, and landmarks 355 by proving the LLM with a set of input parameters that indicate a scope, objectives, and constraints of an autonomous pentest. In some examples, the LLM prompt to generate the reports 345, exploits 350, and landmarks 355 may be a natural language prompt that includes instructions that indicates characteristics of the target network 335, testing protocols, compliance requirements, or any combination thereof. The LLM may then process the prompt and generate the reports 345, exploits 350, and landmarks 355 for training the AI system 305.

Utilizing the reports 345, exploits 350, and landmarks 355, the AI system 305 may perform one or more autonomous pentests by maintaining awareness of the current testing state and progress through a pentest context window 360. The pentest context window 360 may process information about ongoing pentests, including successfully exploited vulnerabilities, accessed systems and data, attempted but failed exploit paths, among others.

In some examples, the AI system 305 may analyze contextual information obtained from performing autonomous pentests to generate cross-pentest insights 365 that can be applied across multiple pentesting operations. For example, as a result of training the AI system 305, one or more autonomous pentests, or both, the AI system 305 may generate a set of cross-pentest insights 365 that indicates one or more insights 370 (e.g., an insight 370-*a*, an insight 370-*b*, an insight 370-*c*, an insight 370-*d*, an insight 370-*e*, and an insight 370-*f*). For example, the insight 370-*a* may indicate patterns of vulnerable default configurations in commonly used enterprise software. In some other examples, the insight 370-*b* may indicate how compromised low-privilege user credentials can be leveraged to eventually gain domain admin access through privilege escalation techniques. Further, the insight 370-*c* and the insight 370-*d* may indicate common pathways where initial network access can lead to sensitive data exposure, such as finding unencrypted password files or accessing improperly secured cloud storage buckets. The insight 370-*e* may indicate recurring vulnerabilities in network segmentation that allow lateral movement between supposedly isolated systems. Additionally, or alternatively, the insight 370-*f* may indicate patterns where seemingly low-risk misconfigurations can be chained together to achieve relatively significant network compromise. Therefore, the cross-pentest insights 365 may indicate one or more insights 370 that represent patterns and vulnerabilities that occur across different networks and testing scenarios, helping organizations better understand systemic security weaknesses that need to be addressed. For example, the cross-pentest insights 365 may be added as landmarks 355 for further training the AI system 305 to perform autonomous pentests.

In some examples, the cross-pentest insights 365 may be displayed to one or more computing devices 125, app(s) 140, or both to enable users to view and analyze the cross-pentest insights 365 to generate additional TTPs configured to achieve the goals 315 of the AI system 305. To display the cross-pentest insights 365 to one or more users, the AI system 305 may generate one or more narratives 375 that indicate the insights 370 obtained in response to one or more autonomous pentests. In some examples, to generate the one or more narratives 375, the AI system 305 may output (e.g., transmit) the cross-pentest insights 365 via a pipeline 380 connected to a separate AI/ML model (e.g., an LLM). For example, the AI system 305 may output the cross-pentest insights 365 to an LLM that is configured to generate the narratives 375 (e.g., the LLM is finetuned for text generation based on an input of the insights 370). In some cases, the narratives 375 may indicate detailed security postures for organizations, companies, tenants, users, groups of users, or any combination thereof. For example, a narrative 375 may be a compliance narrative that indicates one or more insights 370 about the security compliance of a network 110. In another example, a narrative 375 may be a presentation for a company or organization that indicates the one or more vulnerabilities in a network 110 associated with the company or organization. For example, the presentation can indicate the cross-pentest insights 365 obtained from performing one or more autonomous pentests on the network 110 associated with the company or organization (e.g., the target network 335).

An autonomous pentesting service may utilize the AI system 305 to perform an autonomous pentest that involves retrieving and using cookies. For example, the autonomous pentesting service may utilize the AI system 305 to identify cookies, retrieve keys, decrypt keys and cookies, and obtain information associated with the target network 335 using the decrypted cookies. The AI system 305, using cross-pentest insights 365, may retrieve and use cookies. As an example, the cross-pentest insights 365 may include a hardcoded key embedded within a binary associated with an application (e.g., a browser) and used to encrypt a master key that encrypts cookies. The hardcoded key may be persistent across multiple instances of the application on different hosts in different networks and thus, applicable across other pentesting operations involving the application.

FIG. 4 shows an example of a computing system 400 that supports cookie encryption key compromise via autonomous pentesting in accordance with aspects of the present disclosure. The computing system 400 may implement or be implemented by the computing environment 100, the autonomous pentest map 200, the computing environment 300, or any combination thereof. For example, the computing system 400 may illustrate an autonomous pentest by an autonomous pentesting agent 105 of a network including a host 401. The autonomous pentesting agent 105 may retrieve cookies via the host 401 and use the cookies to obtain information via a server 120.

The autonomous pentesting agent 105 may execute an autonomous pentest of a network including the host 401. For example, during the autonomous pentest, the autonomous pentesting agent 105 may identify and gain unauthorized access to the host 401. In some examples, the autonomous pentesting agent 105 may install a pentesting implant 405 on the host 401. For example, the autonomous pentesting agent 105 may gain the unauthorized access by installing the pentesting implant 405, which may allow the autonomous pentesting agent 105 to control the host 401. The pentesting implant 405 may be an example of a RAT, code input and/or executed at the host 401, or the like that enables the autonomous pentesting agent 105 to perform operations on and/or via the host 401.

Using the unauthorized access to the host 401, the autonomous pentesting agent 105 may identify a browser 410 (e.g., a chromium-based browser) storing cookies 415, including a cookie 415-*a*, a cookie 415-*b*, and a cookie 415-*c*. The browser 410 may store the cookies 415 such that a user of the host 401 may maintain various sessions. For example, the user may establish a session with a server 120 via the browser 410 by completing an authentication flow with the server 120. The host 401 may receive a cookie 415-*a* based on completing the authentication flow, and the browser 410 may store the cookie 415-*a* to maintain the session. For example, the user of the host 401 may terminate and later re-establish a session with the server 120 by providing the cookie 415-*a* to the server 120 (e.g., rather than completing another authentication flow). Put another way, the cookies 415 may be used in place of user credentials (e.g., a username and password combination, a key, etc.) to log in to different websites that the user has previously logged in to.

The browser 410 may encrypt the cookies 415 using a master key 420. For example, the browser 410 may perform an encryption 425 of the cookies 415 using the master key and store encrypted versions of the cookies 415. By storing the cookies 415 as encrypted versions, the browser 410 may attempt to prevent theft and use of the cookies 415 by a bad actor. However, the cookies 415 may be vulnerable to compromise by a third party, such as the autonomous pentesting agent 105 or a malicious actor, that recovers the master key 420. Accordingly, the autonomous pentesting agent 105 may attempt to compromise the cookies 415 and identify information accessible via the cookies 415 to improve security of the network including the host 401. The autonomous pentesting agent 105 may retrieve the master key 420 from local system files at an endpoint or within the network of the host 401.

The master key 420 may be encrypted via a multi-stage encryption 430. For example, the master key 420 may be encrypted via a Data Protection Application Programming Interface (DPAPI) (e.g., a Windows DPAPI). The DPAPI may involve use of a system key 435 and a user key 440. The system key 435 (e.g., a system DPAPI key) may be specific to the host 401 (e.g., specific to a machine that the browser 410 runs on). The user key 440 (e.g., a user DPAPI key) may be specific to a user logged in to the host 401 (e.g., a current user of the host 401, which may vary over time in examples in which the host 401 is shared between multiple users). Additionally, the master key 420 may be encrypted via a hardcoded key 445. The hardcoded key 445 (e.g., a hardcoded Advanced Encryption Standard (AES) key) may be embedded within a binary 413 of a service 412 associated with the browser 410.

The service 412 of the browser 410, such as an elevator service in chromium-based browsers, may decrypt the master key 420 upon request from the browser 410. For example, when the user opens a website on the browser 410 associated with the cookie 415-*a*, the browser 410 may request that the service 412 decrypts the master key 420 such that the browser 410 may decrypt the cookie 415-*a* and include the unencrypted cookie 450 in a request to re-establish the session with the server 120. In some cases, an attacker may attempt to communicate with the service 412 of the browser 410 to decrypt the cookies 415. For example, an attacker may inject code into the browser 410 or drop binaries into directories. However, such operations may be detected by a security system (e.g., of the browser 410, the network including the host 401, etc.). Accordingly, the autonomous pentesting agent 105 may retrieve the system key 435, the user key 440, and the hardcoded key 445 to decrypt the master key 420 and decrypt the cookies 415 using the master key 420 offline (e.g., without communicating with the service 412 of the browser 410).

By performing the decryption offline, the autonomous pentesting agent 105 may identify vulnerabilities of the network that are undetected by existing security systems. In other words, decrypting the master key 420 and the cookies 415 offline (e.g., without requesting decryption from service(s) of the browser 410), may allow the autonomous pentesting agent 105 to bypass one or more security restrictions of the browser 410, the network of the host 401, and the host 401 to identify security vulnerabilities. The operations described herein may improve persistence in maintaining access to compromised web sessions while reducing the risk of being discovered by endpoint detection and response (EDR) solutions.

The autonomous pentesting agent 105 may retrieve the system key 435 via a memory dump. For example, the autonomous pentesting agent 105 may retrieve the system key 435 by performing a memory dump from an LSASS. The autonomous pentesting agent 105 may, in some examples, also retrieve the user key 440 via the memory dump. The LSASS may store authentication data for the host 401, including data that may be used to retrieve the system key 435, the user key 440, or both.

Additionally, or alternatively, the autonomous pentesting agent 105 may derive the user key 440 using a new technology (NT) local area network (LAN) manager (NTLM) hash authentication technique in a domain environment. For example, the NTLM hash authentication technique may involve one or more communications that authenticate the user of the host 401 who is impersonated by the autonomous pentesting agent 105 in the example of FIG. 4. According to an NTLM hash authentication procedure, a hash of a password of the user may be equivalent to knowledge of the password itself. Thus, the autonomous pentesting agent 105 may use the hash of the password of the user to be authenticated and retrieve the user key 440. In some examples, the autonomous pentesting agent 105 may scan a memory of the host 401 for data used to derive the NTLM hash. The NTLM hash may refer to a LAN manager (LM) hash, an NT hash, or both. In some examples, an LSASS at the host 401 may store the LM hash, the NT hash, or both, and the autonomous pentesting agent 105 may use the LSASS dump in combination with the NTLM hash authentication technique to retrieve the user key 440.

The autonomous pentesting agent 105 may retrieve the hardcoded key 445 via decompilation. For example, the autonomous pentesting agent 105 may reverse-engineer the hardcoded key 445 from a binary 413 of a service 412 of the browser 410 (or from a binary 411 of the browser 410) using decompilation. Decompilation may refer to using a computer program to transform executable code into source code. Put another way, the autonomous pentesting agent 105 may use a decompiler to reveal a source code of the browser 410 (or the service 412 associated with the browser 410) that includes the hardcoded key 445. Because the hardcoded key 445 may be associated with the browser 410, the autonomous pentesting agent 105 may reuse the hardcoded key 445 across different pentests. In such examples, the autonomous pentesting agent 105 may retrieve the hardcoded key 445 from memory based on retrieving the hardcoded key 445 during a prior pentesting operation.

In some examples, the autonomous pentesting agent 105 may automate extraction of encryption keys across different versions of an application (e.g., if the application introduced version-specific encryption). For example, the autonomous pentesting agent 105 may, after identifying that a new version of the browser 410 is available, automatically obtain and decompile binary (e.g., a binary file) of the new version of the browser 410 to retrieve an updated hardcoded key.

The autonomous pentesting agent 105 may decrypt the master key 420 via multi-stage decryption using the retrieved keys. For example, the autonomous pentesting agent 105 may decrypt the master key 420 via the hardcoded key 445, via the user key 440, and via the system key 435. The autonomous pentesting agent 105 may decrypt the cookies 415 using the master key 420 after the multi-stage decryption. For example, the autonomous pentesting agent 105 may decrypt the cookie 415-*a*.

In some examples, the autonomous pentesting agent 105 may identify, based on the decrypted cookies, websites accessible via the cookies. That is, the cookies 415 may include information indicative of a website that the respective cookies are associated with. As an example, the cookie 415-*a* may include information indicative of an identity management website used to manage access to multiple applications. The autonomous pentesting agent 105 may extract intelligence on applications used by an organization associated with the host 401 based on data of the cookies 415. Additionally, or alternatively, the autonomous pentesting agent 105 may prioritize or de-prioritize the cookies 415 based on identifying the associated websites. For example, the autonomous pentesting agent 105 may prioritize the cookie 415-*a* associated with the identity management website over the cookie 415-*b* associated with a video streaming website, as the cookie 415-*a* may allow access to greater amounts of information or more sensitive information than the cookie 415-*b*.

The autonomous pentesting agent 105 may transmit a request to access an application or website associated with the cookie 415-*a* via the external network 155 to the server 120. For example, the autonomous pentesting agent 105 may transmit a request message including an unencrypted cookie 450 to the server 120. In some examples, the autonomous pentesting agent 105 may transmit the request via the pentesting implant 405. For example, the autonomous pentesting agent 105 may transmit the request including the cookie 415-*a* through the same implant used to discover the cookies. By using the pentesting implant 405 to transmit the request, the autonomous pentesting agent 105 may avoid fraud detection mechanisms that may prevent or flag unauthorized access attempts. One such example of a fraud detection mechanism may be an impossible travel protection, which may detect which internet protocol (IP) address was last used and disable requests if the requests are sent from another IP address.

In response to the request including the unencrypted cookie 450, the server 120 may establish (e.g., re-establish) a session with the host 401. After the session is established, the autonomous pentesting agent 105 may obtain information 455. For example, the autonomous pentesting agent 105 may access applications and information 455 on the applications via the identity management website accessed via the cookie 415-*a*. In some examples, the information 455 may include telemetry data, PII, or other data associated with the applications, the browser 410, the host 401, or the network of the host 401.

The autonomous pentesting agent 105 may output recommendations and/or identify security vulnerabilities based on the autonomous pentest. For example, the autonomous pentesting agent 105 may identify trends in cookie expiration times to target long-lived authentication sessions. That is, the autonomous pentesting agent 105 may identify cookies having expiration times past a threshold duration configured for the network or recommended by the autonomous pentesting agent 105. In such examples, the autonomous pentesting agent 105 may recommend a security policy adjustment for the network to eliminate cookies after the threshold duration. Additionally, or alternatively, the autonomous pentesting agent 105 may scan a history of the browser 410 to identify malicious activity. For example, the autonomous pentesting agent 105 may identify one or more websites on the history associated with installation of malware, phishing activity, or other security threats. In such examples, the autonomous pentesting agent 105 may recommend that access to the one or more websites be blocked.

While the exemplary cookie encryption key compromise via autonomous pentesting described with reference to FIG. 4 is with respect to the browser 410, it should be understood that techniques described herein may be extended to applications of networks generally. For example, the browser 410 may be one example of an application that uses cookies to manage sessions for a user.

Figure 5:
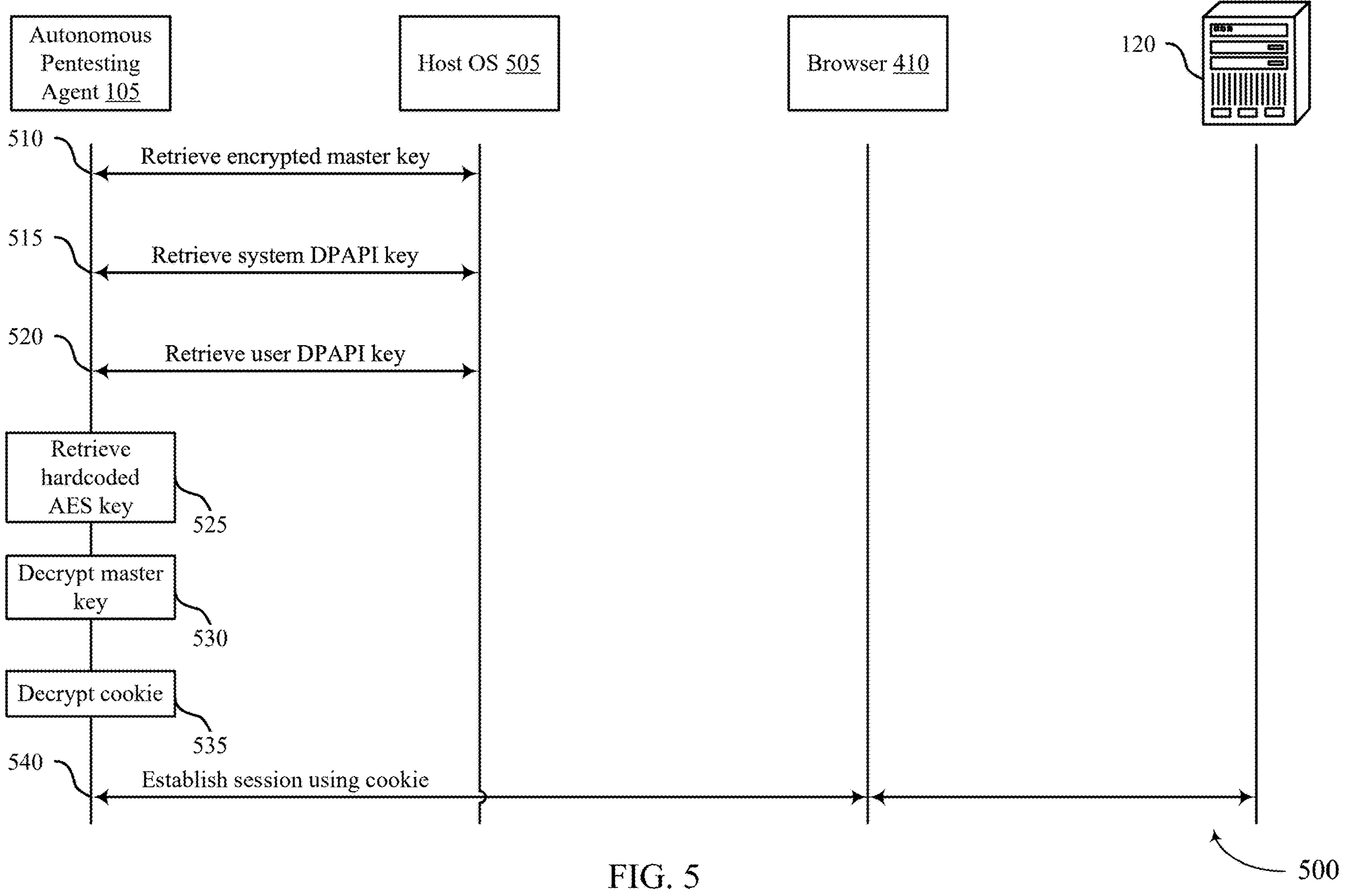
FIG. 5 shows an example of a process flow that supports cookie encryption key compromise via autonomous pentesting in accordance with aspects of the present disclosure.

FIG. 5 shows an example of a process flow 500 that supports cookie encryption key compromise via autonomous pentesting in accordance with aspects of the present disclosure. The process flow 500 may implement or be implemented by the computing environment 100, the autonomous pentest map 200, the computing environment 300, the computing system 400, or any combination thereof. For example, the process flow 500 may include an autonomous pentesting agent 105, a host operating system (OS) 505, a browser 410, and a server 120, which may be examples of corresponding devices or systems as described with reference to FIGS. 1 through 4.

Alternative examples of the following may be implemented, where some operations are performed in a different order than described or are not performed at all. In some examples, operations may include additional features not mentioned below, or further operations may be added. Although the autonomous pentesting agent 105, the host OS 505, the browser 410, and the server 120 are shown performing the operations of the process flow 500, some aspects of some operations may also be performed by one or more other devices or systems. The process flow 500 may illustrate operations performed by the autonomous pentesting agent 105 during an autonomous pentest.

For example, an autonomous pentest, such as by the autonomous pentesting agent 105, may be used to obtain information related to encryption keys that are used for encrypting cookies used in place of user login information. Once this information related to the encryption keys is obtained, the autonomous pentesting agent 105 may perform offline decryption to obtain a master encryption key used to encrypt all cookies for a logged-in user on a system. The master encryption key may be decrypted and used to decrypt browser cookies to obtain user credentials to various websites, which may then be exploited as part of an autonomous pentest.

Some web browsers, such as chromium-based browsers like Google Chrome, may encrypt authentication cookies to secure user sessions. These cookies may be protected through encryption via a master key, which is encrypted using DPAPI and a hardcoded AES key. DPAPI may involve system-specific and user-specific encryption keys. Some browsers may also include an "elevator service" mechanism that restricts decryption to the browser itself.

The elevator service may operate with system-level privileges and may decrypt the master key upon request from the browser 410. In some cases, attackers attempting to decrypt cookies may interact with this service, injecting code into the browser 410 or dropping binaries into specific directories-both of which may be detected by security software. The browser 410 may include security enhancements that prevent unauthorized decryption, ensuring that even if an attacker gains access to a system with user privileges, they may not easily extract cookies. Accordingly, the autonomous pentesting agent 105 may circumvent the security protections of the browser 410 associated with the elevator service by decrypting the master key offline (e.g., without communication with the elevator service).

At 510, the autonomous pentesting agent 105 may retrieve an encrypted master key. For example, instead of requesting decryption from an elevator service of the browser 410 (e.g., a chromium-based browser, such as Chrome), the autonomous pentesting agent 105 may retrieve the encrypted master key from local system files at an endpoint or within the network. In the example of the process flow 500, the autonomous pentesting agent 105 may retrieve the encrypted master key from system files of a host (e.g., from the host OS 505). The master cookie key may be encrypted using three encryption keys, which may be decoded offline.

At 515, the autonomous pentesting agent 105 may retrieve a system DPAPI key. For example, the autonomous pentesting agent 105 may retrieve the system DPAPI key by dumping memory from LSASS, which may be a technique used in various credential theft attacks. Additionally, at 520, the autonomous pentesting agent 105 may retrieve a user DPAPI key. For example, the autonomous pentesting agent 105 may extract the user DPAPI key from LSASS or derive the user DPAPI key using NTLM hash authentication techniques in domain environments.

At 525, the autonomous pentesting agent 105 may retrieve a hardcoded AES key. The hardcoded AES key may be embedded in binary associated with the browser 410. The hardcoded AES key may be embedded within the browser 410 binary and reverse-engineered using decompilation techniques. For example, the hardcoded AES key may be retrieved via the binary associated with the browser 410 during the autonomous pentest by the autonomous pentesting agent 105, provided as an input to the autonomous pentest, or known by the autonomous pentesting agent 105.

At 530, the autonomous pentesting agent 105 may decrypt the master key. For example, the autonomous pentesting agent 105 may use the three encryption keys (e.g., the system DPAPI key, the user DPAPI key, and the hardcoded AES key) to decrypt the master key offline. The autonomous pentesting agent 105 may decrypt the master key offline as opposed to requesting decryption by an elevator service of the browser 410.

At 535, the autonomous pentesting agent 105 may decrypt a cookie. For example, the master key, after being decrypted using the three encryption keys, can be used to decrypt cookies associated with a user found at the host OS 505 by the autonomous pentesting agent 105. The master key may be user-specific (e.g., based on the master key being encrypted using the user DPAPI key). That is, the autonomous pentesting agent 105 may decrypt cookies associated with other users by obtaining the user DPAPI keys associated with the other users to decrypt respective master keys associated with the other users. In such examples, the autonomous pentesting agent 105 may re-use the system DPAPI key (e.g., if the users are associated with a same device) and the hardcoded AES key to decrypt the respective master keys.

The autonomous pentesting agent 105 may, at 540, establish a session using the cookie with a server 120 via the browser 410. For instance, if the autonomous pentesting agent 105 identifies an Okta cookie, the autonomous pentesting agent 105 may transmit a request to access Okta (e.g., to an Okta application server) through the same implant (e.g., a RAT) that found the cookies. Transmitting the request through the implant may avoid an impossible travel protection (e.g., websites detect which IP was last used and disable access if attempting from another IP).

Unlike some other attacks that interact with the elevator service of the browser 410, which may raise security alarms, decrypting the master key offline (e.g., by retrieving the three encryption keys) may bypass security restrictions. The decrypted cookies may be used via the same compromised system where they were stolen, preventing fraud detection mechanisms (such as "impossible travel" protections) from flagging unauthorized access. This may ensure persistence in maintaining access to compromised web sessions while reducing the risk of being discovered by EDR solutions.

Figure 6:
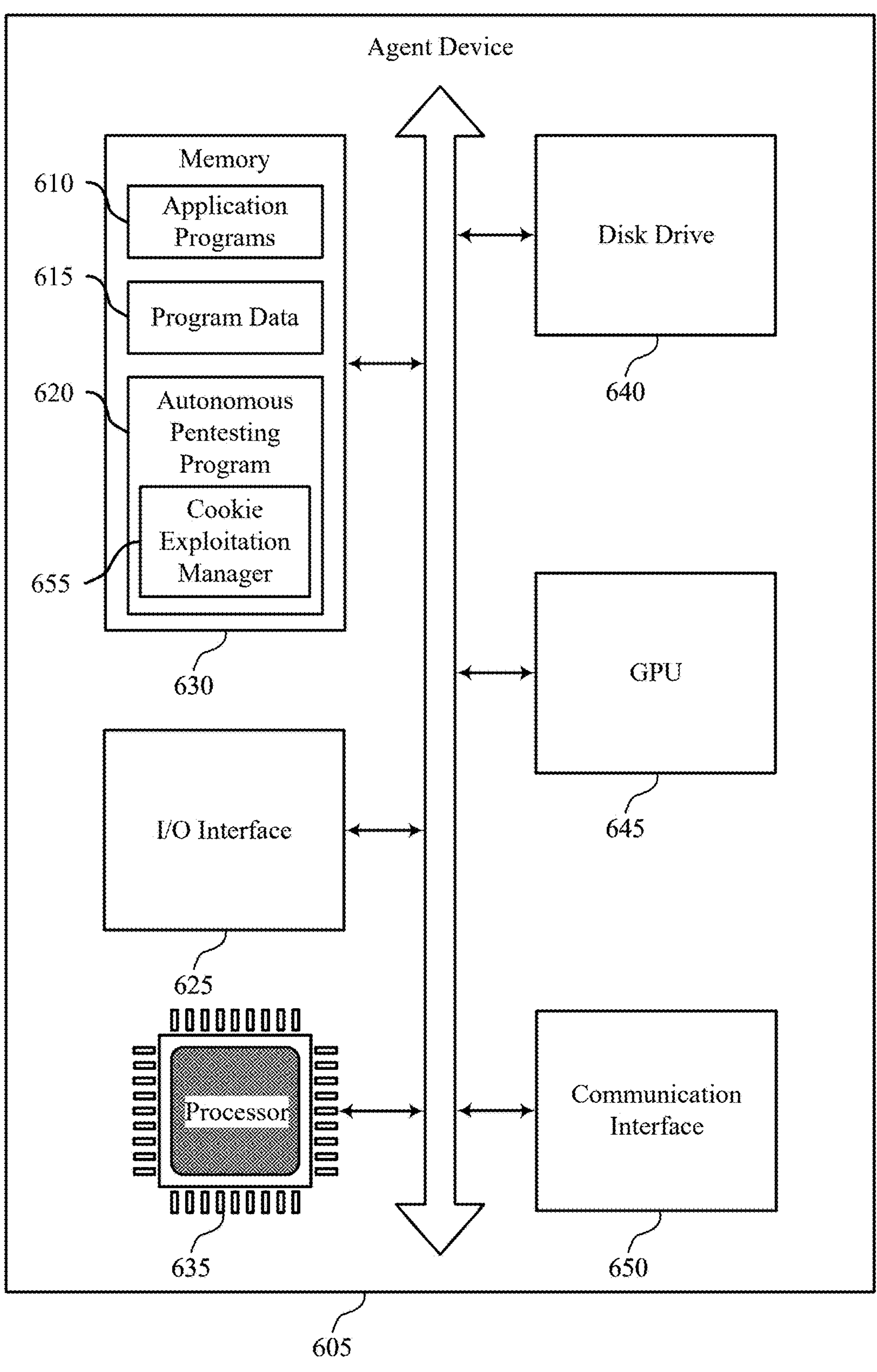
FIG. 6 shows a diagram of a system including a device that supports cookie encryption key compromise via autonomous pentesting in accordance with aspects of the present disclosure.

FIG. 6 shows a diagram of a system 600 including an agent device 605 that supports cookie encryption key compromise via autonomous pentesting in accordance with aspects of the present disclosure. The agent device 605 may be an example of a device or server on which an autonomous pentesting agent 105 is deployed as described herein. The agent device 605 may include components for cookie encryption key compromise via autonomous pentesting, such as a memory 630 including application programs 610, program data 615, an autonomous pentesting program 620, and a cookie exploitation manager 655; an input/output (I/O) interface 625; a processor 635; a disk drive 640; a graphics processing unit (GPU) 645; and a communication interface 650. Each of these components may communicate, directly or indirectly, with one another (e.g., via one or more buses, communications links, communications interfaces, or any combination thereof).

The I/O interface 625 may support connection of the agent device 605 with one or more other devices. For example, the agent device 605 may connect to keyboards, mice, printers, hard disks, or the like via the I/O interface 625. The I/O interface 625 may communicate with the processor 635. That is, the processor 635 may process signals from devices connected to the agent device 605 via the I/O interface 625.

Memory 630 may include RAM, ROM, or both. The memory 630 may store computer-readable, computer-executable software including instructions that, when executed, cause at least one processor 635 to perform various functions described herein, such as functions supporting cookie encryption key compromise via autonomous pentesting. In some cases, the memory 630 may contain, among other things, a basic input/output system (BIOS), which may control basic hardware or software operation such as the interaction with peripheral components or devices. The memory 630 may be an example of a single memory or multiple memories. For example, the agent device 605 may include one or more memories 630.

The application programs 610 in the memory 630 may be examples of app(s) 140 as described with reference to FIG. 1. For example, the application programs 610 may be installed on the memory 630 of the agent device 605, among other devices in a network. The application programs 610 may be examples of software applications or computer programs that are implemented to carry out one or more functions or tasks.

The program data 615 may be data related to the application programs 610. Program data 615 may be an example of or refer to running data of programs and applications installed on the memory 630 of the agent device 605. In some examples, the program data 615 may include various data, including code that allows the application programs 610 to perform the one or more functions or tasks.

The processor 635 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 635 may be configured to execute computer-readable instructions stored in at least one memory 630 to perform various functions (e.g., functions or tasks supporting cookie encryption key compromise via autonomous pentesting). Though a single processor 635 is depicted in the example of FIG. 5, it is to be understood that the system 600 may include any quantity of one or more of processors 635 and that a group of processors 635 may collectively perform one or more functions ascribed herein to a processor, such as the processor 635. The processor 635 may be an example of a single processor or multiple processors. For example, the agent device 605 may include one or more processors 635.

The disk drive 640 may be configured to store data that is generated, processed, stored, or otherwise used by the system 600. In some cases, the disk drive 640 may include one or more hard disk drives (HDDs), one or more solid-state drives (SSDs), or both. In some examples, the disk drive 640 may be an example of a single database, a distributed database, multiple distributed databases, a data store, a data lake, or an emergency backup database. In some examples, the disk drive 640 may be an example of one or more components described with reference to FIG. 1.

GPU 645 may be configured to store graphics-related data. The GPU 645 may store and manage data related to graphics and video processing. In some examples, the GPU 645 may be an example of or a component of a graphics card. The GPU 645 may use components of the memory 630, including the RAM, for temporary storage. For example, the GPU 645 may move data from the RAM of the memory 630 to the GPU 645 for graphics and video processing.

The communication interface 650 may enable the agent device 605 to exchange information (e.g., input information, output information, or both) with other systems or devices (not shown). For example, the communication interface 650 may enable the agent device 605 to connect to a network (e.g., a network 110 as described herein). The communication interface 650 may include one or more wireless network interfaces, one or more wired network interfaces, or any combination thereof.

The autonomous pentesting program 620 may be an example of a program of an autonomous pentesting service that is installed on the memory 630 of the agent device 605. The autonomous pentesting program 620 may execute an autonomous pentest of a network accessed by the agent device 605, such as accessed via the communication interface 650. That is, the autonomous pentesting program 620 may be configured to perform an autonomous pentest as described herein, including an autonomous pentest involving compromising cookies via autonomous pentesting.

The cookie exploitation manager 655 may support compromising cookies via autonomous pentesting in accordance with examples as disclosed herein. For example, the cookie exploitation manager 655 may be configured as or otherwise support a means for executing an autonomous pentest of a network, wherein executing the autonomous pentest comprises gaining unauthorized access to a network asset of the network associated with a user and identifying a plurality of cookies associated with the user stored on the network asset, the plurality of cookies encrypted via a master key. The cookie exploitation manager 655 may be configured as or otherwise support a means for retrieving an encrypted version of the master key based at least in part on identifying the plurality of cookies encrypted via the master key, wherein the encrypted version of the master key is encrypted via a multi-stage encryption using a plurality of keys. The cookie exploitation manager 655 may be configured as or otherwise support a means for retrieving the plurality of keys based at least in part on retrieving the encrypted version of the master key, wherein at least one key of the plurality of keys comprises a hardcoded key embedded within a binary associated with an application running on the network asset and at least one other key of the plurality of keys is retrieved via the autonomous pentest of the network. The cookie exploitation manager 655 may be configured as or otherwise support a means for decrypting the master key via a multi-stage decryption using the plurality of keys. The cookie exploitation manager 655 may be configured as or otherwise support a means for obtaining information associated with the user or associated with the network asset based at least in part on the unauthorized access to the network asset and using a cookie of the plurality of cookies that is decrypted using the master key.

By including or configuring the cookie exploitation manager 655 in accordance with examples as described herein, the agent device 605 may support techniques for improved network security.

Figure 7:
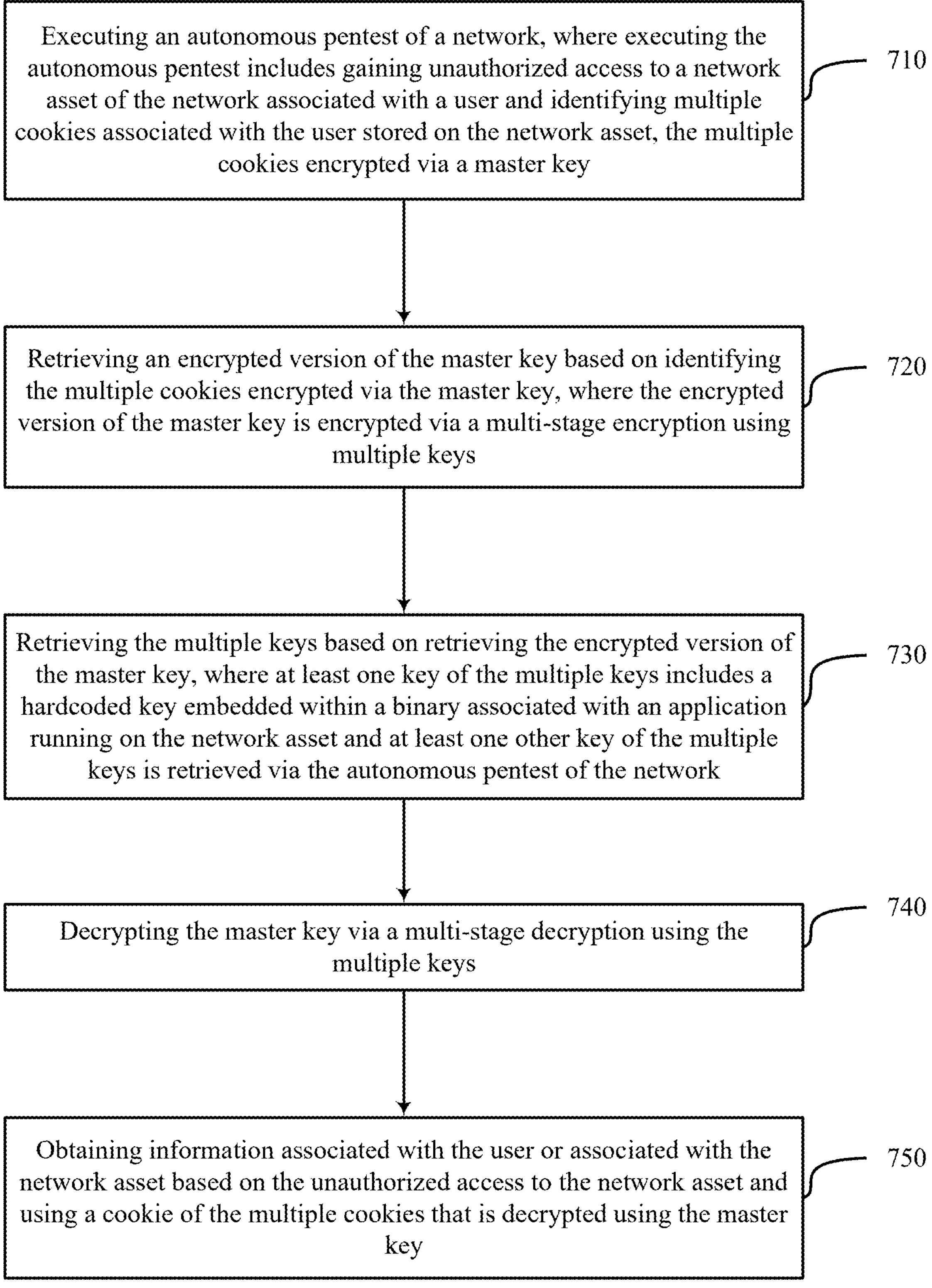
FIG. 7 shows a flowchart illustrating methods that support cookie encryption key compromise via autonomous pentesting in accordance with aspects of the present disclosure.

FIG. 7 shows a flowchart illustrating a method 700 that supports cookie encryption key compromise via autonomous pentesting in accordance with aspects of the present disclosure. The operations of the method 700 may be implemented by an agent device 605 or its components as described herein. In some examples, an agent device may execute a set of instructions to control the functional elements of the agent device to perform the described functions. Additionally, or alternatively, the agent device may perform aspects of the described functions using special-purpose hardware.

At 710, the method may include executing an autonomous pentest of a network, wherein executing the autonomous pentest includes gaining unauthorized access to a network asset of the network associated with a user and identifying multiple cookies associated with the user stored on the network asset, the multiple cookies encrypted via a master key.

At 720, the method may include retrieving an encrypted version of the master key based on identifying the multiple cookies encrypted via the master key, where the encrypted version of the master key is encrypted via a multi-stage encryption using multiple keys.

At 730, the method may include retrieving the plurality of keys based on retrieving the encrypted version of the master key, where at least one key of multiple keys includes a hardcoded key embedded within a binary associated with an application running on the network asset and at least one other key of the multiple keys is retrieved via the autonomous pentest of the network.

At 740, the method may include decrypting the master key via a multi-stage decryption using the multiple keys.

At 750, the method may include obtaining information associated with the user or associated with the network asset based on the unauthorized access to the network asset and using a cookie of the multiple cookies that is decrypted using the master key.

The following provides an overview of aspects of the present disclosure:

Aspect 1: A method for compromising cookies via autonomous pentesting comprising: executing an autonomous pentest of a network, wherein executing the autonomous pentest comprises gaining unauthorized access to a network asset of the network associated with a user and identifying a plurality of cookies associated with the user stored on the network asset, the plurality of cookies encrypted via a master key; retrieving an encrypted version of the master key based at least in part on identifying the plurality of cookies encrypted via the master key, wherein the encrypted version of the master key is encrypted via a multi-stage encryption using a plurality of keys; retrieving the plurality of keys based at least in part on retrieving the encrypted version of the master key, wherein at least one key of the plurality of keys comprises a hardcoded key embedded within a binary associated with an application running on the network asset and at least one other key of the plurality of keys is retrieved via the autonomous pentest of the network; decrypting the master key via a multi-stage decryption using the plurality of keys; and obtaining information associated with the user or associated with the network asset based at least in part on the unauthorized access to the network asset and using a cookie of the plurality of cookies that is decrypted using the master key.

Aspect 2: The method of aspect 1, wherein the multi-stage encryption comprises: a first encryption using a system key associated with the network asset, a second encryption using a user key associated with the user, and a third encryption using the hardcoded key embedded within the binary associated with the application.

Aspect 3: The method of aspect 2, wherein the system key and the user key comprise DPAPI keys.

Aspect 4: The method of aspect 2, wherein retrieving the plurality of keys comprises: retrieving the system key via a LSASS dump associated with the network asset; and retrieving the user key via the LSASS dump or via a NTLAN hash authentication operation.

Aspect 5: The method of any of aspects 1 through 4, wherein retrieving the plurality of keys comprises: retrieving the hardcoded key via a decompilation operation of the binary associated with the application.

Aspect 6: The method of any of aspects 1 through 5, wherein executing the autonomous pentest of the network comprises: installing a pentesting implant at the network asset.

Aspect 7: The method of aspect 6, wherein the plurality of keys are retrieved via the pentesting implant installed at the network asset.

Aspect 8: The method of aspect 6, further comprising: transmitting, via the pentesting implant, one or more requests from the network asset using the cookie that is decrypted using the master key, wherein the information is obtained based at least in part on transmitting the one or more requests.

Aspect 9: The method of any of aspects 1 through 8, wherein the master key is decrypted independently from one or more services of the application.

Aspect 10: The method of any of aspects 1 through 9, further comprising: identifying one or more sessions between the user and one or more services or devices external to the network asset, wherein the one or more sessions are associated with one or more cookies of the plurality of cookies, the one or more sessions having one or more durations that exceed a threshold; and outputting a network security recommendation to update the one or more cookies associated with the one or more sessions based at least in part on the one or more sessions having the one or more durations that exceed the threshold.

Aspect 11: The method of any of aspects 1 through 10, further comprising: scanning a history associated with the application running on the network asset; detecting one or more indicators of compromise in the history of the application running on the network asset; and outputting a network security recommendation to block access to one or more activities associated with the one or more indicators of compromise.

Aspect 12: The method of any of aspects 1 through 11, further comprising: outputting a network assessment report indicating the information stored on the network that is accessible using the cookie.

Aspect 13: The method of aspect 12, wherein the network assessment report comprises one or more security policy recommendations that are in accordance with preventing the unauthorized access to the network asset, preventing persistent use of one or more cookies used to access the information, or both.

Aspect 14: The method of any of aspects 1 through 13, wherein the application running on the network asset comprises a browser.

Aspect 15: An apparatus for compromising cookies via autonomous pentesting, comprising: one or more memories storing processor-executable code; and one or more processors coupled with the one or more memories and individually or collectively operable to execute the code to cause the apparatus to perform a method of any of aspects 1 through 14.

Aspect 16: A non-transitory computer-readable medium storing code for compromising cookies via autonomous pentesting, the code comprising instructions executable by one or more processors to perform a method of any of aspects 1 through 14.

Aspect 17: An apparatus for compromising cookies via autonomous pentesting, comprising at least one means for performing a method of any aspects 1 through 14.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for compromising cookies via autonomous pentesting comprising:

executing an autonomous pentest of a network, wherein executing the autonomous pentest comprises gaining unauthorized access to a network asset of the network associated with a user and identifying a plurality of cookies associated with the user stored on the network asset, the plurality of cookies encrypted via a master key;

retrieving an encrypted version of the master key based at least in part on identifying the plurality of cookies encrypted via the master key, wherein the encrypted version of the master key is encrypted via a multi-stage encryption using a plurality of keys;

retrieving the plurality of keys based at least in part on retrieving the encrypted version of the master key, wherein at least one key of the plurality of keys comprises a hardcoded key embedded within a binary associated with an application running on the network asset and at least one other key of the plurality of keys is retrieved via the autonomous pentest of the network;

decrypting the master key via a multi-stage decryption using the plurality of keys; and obtaining information associated with the user or associated with the network asset based at least in part on the unauthorized access to the network asset and using a cookie of the plurality of cookies that is decrypted using the master key.

2. The method of claim 1, wherein the multi-stage encryption comprises:

a first encryption using a system key associated with the network asset, a second encryption using a user key associated with the user, and a third encryption using the hardcoded key embedded within the binary associated with the application.

3. The method of claim 2, wherein the system key and the user key comprise data protection application programming interface (DPAPI) keys.

4. The method of claim 2, wherein retrieving the plurality of keys comprises:

retrieving the system key via a local security authority subsystem service (LSASS) dump associated with the network asset; and retrieving the user key via the LSASS dump or via a new technology local area network manager (NTLM) hash authentication operation.

5. The method of claim 1, wherein retrieving the plurality of keys comprises:

retrieving the hardcoded key via a decompilation operation of the binary associated with the application.

6. The method of claim 1, wherein executing the autonomous pentest of the network comprises:

installing a pentesting implant at the network asset.

7. The method of claim 6, wherein the plurality of keys are retrieved via the pentesting implant installed at the network asset.

8. The method of claim 6, further comprising:

transmitting, via the pentesting implant, one or more requests from the network asset using the cookie that is decrypted using the master key, wherein the information is obtained based at least in part on transmitting the one or more requests.

9. The method of claim 1, wherein the master key is decrypted independently from one or more services of the application.

10. The method of claim 1, further comprising:

identifying one or more sessions between the user and one or more services or devices external to the network asset, wherein the one or more sessions are associated with one or more cookies of the plurality of cookies, the one or more sessions having one or more durations that exceed a threshold; and outputting a network security recommendation to update the one or more cookies associated with the one or more sessions based at least in part on the one or more sessions having the one or more durations that exceed the threshold.

11. The method of claim 1, further comprising:

scanning a history associated with the application running on the network asset;

detecting one or more indicators of compromise in the history of the application running on the network asset; and outputting a network security recommendation to block access to one or more activities associated with the one or more indicators of compromise.

12. The method of claim 1, further comprising:

outputting a network assessment report indicating the information stored on the network that is accessible using the cookie.

13. The method of claim 12, wherein the network assessment report comprises one or more security policy recommendations that are in accordance with preventing the unauthorized access to the network asset, preventing persistent use of one or more cookies used to access the information, or both.

14. The method of claim 1, wherein the application running on the network asset comprises a browser.

15. An apparatus for compromising cookies via autonomous pentesting, comprising:

one or more memories storing processor-executable code; and one or more processors coupled with the one or more memories and individually or collectively operable to execute the code to cause the apparatus to:

execute an autonomous pentest of a network, wherein executing the autonomous pentest comprises gaining unauthorized access to a network asset of the network associated with a user and identifying a plurality of cookies associated with the user stored on the network asset, the plurality of cookies encrypted via a master key;

retrieve an encrypted version of the master key based at least in part on identifying the plurality of cookies encrypted via the master key, wherein the encrypted version of the master key is encrypted via a multi-stage encryption using a plurality of keys;

retrieve the plurality of keys based at least in part on retrieving the encrypted version of the master key, wherein at least one key of the plurality of keys comprises a hardcoded key embedded within a binary associated with an application running on the network asset and at least one other key of the plurality of keys is retrieved via the autonomous pentest of the network;

decrypt the master key via a multi-stage decryption using the plurality of keys; and obtain information associated with the user or associated with the network asset based at least in part on the unauthorized access to the network asset and using a cookie of the plurality of cookies that is decrypted using the master key.

16. The apparatus of claim 15, wherein the multi-stage encryption comprises:

a first encryption using a system key associated with the network asset, a second encryption using a user key associated with the user, and a third encryption using the hardcoded key embedded within the binary associated with the application.

17. The apparatus of claim 16, wherein the system key and the user key comprise data protection application programming interface (DPAPI) keys.

18. A non-transitory computer-readable medium storing code for compromising cookies via autonomous pentesting, the code comprising instructions executable by one or more processors to:

execute an autonomous pentest of a network, wherein executing the autonomous pentest comprises gaining unauthorized access to a network asset of the network associated with a user and identifying a plurality of cookies associated with the user stored on the network asset, the plurality of cookies encrypted via a master key;

retrieve an encrypted version of the master key based at least in part on identifying the plurality of cookies encrypted via the master key, wherein the encrypted version of the master key is encrypted via a multi-stage encryption using a plurality of keys;

retrieve the plurality of keys based at least in part on retrieving the encrypted version of the master key, wherein at least one key of the plurality of keys comprises a hardcoded key embedded within a binary associated with an application running on the network asset and at least one other key of the plurality of keys is retrieved via the autonomous pentest of the network;

decrypt the master key via a multi-stage decryption using the plurality of keys; and obtain information associated with the user or associated with the network asset based at least in part on the unauthorized access to the network asset and using a cookie of the plurality of cookies that is decrypted using the master key.

19. The non-transitory computer-readable medium of claim 18, wherein the multi-stage encryption comprises:

a first encryption using a system key associated with the network asset, a second encryption using a user key associated with the user, and a third encryption using the hardcoded key embedded within the binary associated with the application.

20. The non-transitory computer-readable medium of claim 19, wherein the system key and the user key comprise data protection application programming interface (DPAPI) keys.

* * * * *